(12) United States Patent
Narayan

(10) Patent No.: US 9,317,101 B2
(45) Date of Patent: Apr. 19, 2016

(54) TECHNIQUES FOR MULTIMEDIA PLAYBACK

(71) Applicant: Intel Corporation, Santa Clara, CA (US)

(72) Inventor: Ravish Karki Narayan, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 170 days.

(21) Appl. No.: 13/794,669

(22) Filed: Mar. 11, 2013

(65) Prior Publication Data
US 2014/0258747 A1    Sep. 11, 2014

(51) Int. Cl.
*G06F 1/32* (2006.01)

(52) U.S. Cl.
CPC ............ *G06F 1/3246* (2013.01); *G06F 1/3287* (2013.01)

(58) Field of Classification Search
USPC .......................................... 713/300, 323, 322
See application file for complete search history.

(56) References Cited

U.S. PATENT DOCUMENTS

| | | | |
|---|---|---|---|
| 7,069,014 B1 * | 6/2006 | Thenthiruperai et al. | . 455/452.2 |
| 8,789,094 B1 * | 7/2014 | Singh et al. | 725/37 |
| 2007/0249395 A1 * | 10/2007 | Kondo et al. | 455/556.1 |
| 2008/0098449 A1 * | 4/2008 | Lim | 725/131 |
| 2008/0225953 A1 * | 9/2008 | Ratakonda et al. | 375/240.21 |
| 2009/0204731 A1 * | 8/2009 | Mulligan et al. | 710/20 |
| 2011/0066673 A1 * | 3/2011 | Outlaw | 709/203 |
| 2012/0023256 A1 * | 1/2012 | Chen et al. | 709/231 |
| 2014/0327547 A1 * | 11/2014 | Johnson et al. | 340/601 |

* cited by examiner

*Primary Examiner* — Vincent Tran
(74) *Attorney, Agent, or Firm* — Kacvinsky Daisak Bluni PLLC

(57) ABSTRACT

Various embodiments are generally directed to an apparatus, method and other techniques for receiving multimedia information at a computing device and receiving one or more of power information and bandwidth information for the computing device. In various embodiments, video processing may be disabled for the computing device when the power information is below a power threshold or bandwidth information is below a bandwidth threshold and an audio only portion of multimedia information may be sent to one or more output devices coupled to the computing device. Other embodiments are described and claimed.

18 Claims, 8 Drawing Sheets

500

RECEIVE MULTIMEDIA INFORMATION AT A COMPUTING DEVICE
505

RECEIVE ONE OR MORE OF POWER INFORMATION AND BANDWIDTH INFORMATION FOR THE COMPUTING DEVICE
510

DISABLING VIDEO PROCESSING FOR THE COMPUTING DEVICE IF THE POWER INFORMATION IS BELOW A POWER THRESHOLD OR A BANDWIDTH INFORMATION IS BELOW A BANDWIDTH THRESHOLD
515

SENDING AN AUDIO ONLY PORTION OF THE MULTIMEDIA INFORMATION TO ONE OR MORE OUTPUT DEVICES COUPLED TO THE COMPUTING DEVICE
520

*FIG. 5*

TECHNIQUES FOR MULTIMEDIA PLAYBACK

TECHNICAL FIELD

Embodiments described herein generally relate to playback of multimedia information on a computing device.

BACKGROUND

Devices such as wireless mobile devices, mobile cellular phones, smartphones, tablet computers, laptop computers, etc. increasingly consume large amounts of multimedia content over wireless and wired connections during multimedia playback. This multimedia content may be streamed to a user's device over a network, such as a wireless cellular network, from a multimedia service provider or a network service provider. For example, the multimedia content may be streamed from a multimedia provider such as YOUTUBE®, BLIP.TV®, VIMEO®, HULU®, VEOH®, etc. and received at a user's device. The multimedia content may be received directly from a multimedia provider or may be processed through a network service provider such as VERIZON®, AT&T®, T-MOBILE®, SPRINT®, etc. Alternatively and in various embodiments, the multimedia content may be received directly from the network service providers themselves. It is with respect to these and other considerations that the embodiments described herein.

BRIEF DESCRIPTION OF THE DRAWINGS

FIG. 5 illustrates an embodiment of a second logic flow.

DETAILED DESCRIPTION

Figure 1:
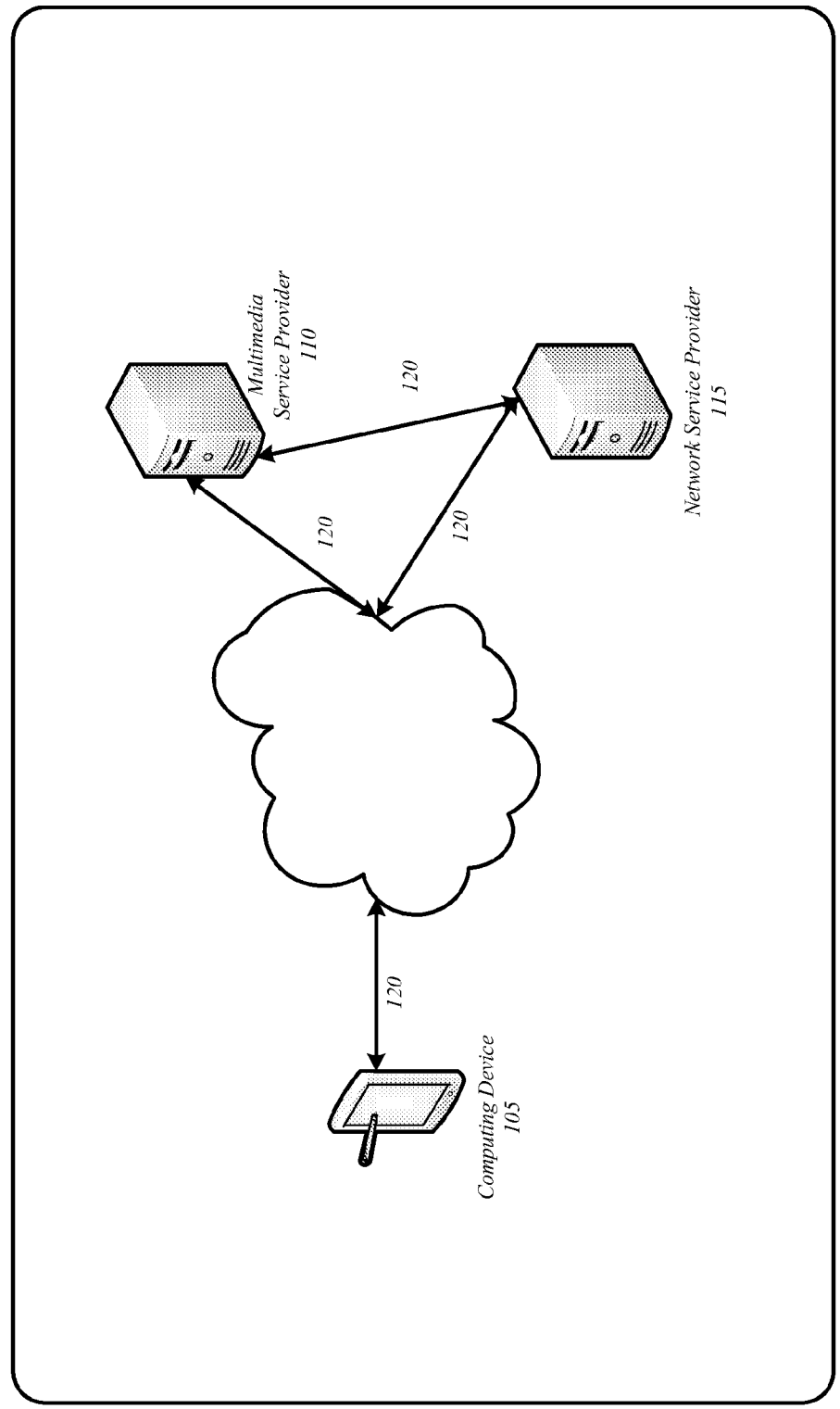
FIG. 1 illustrates an embodiment of a first system.

In various embodiments, information and content may be streamed to a user's device over a network, such as a wireless cellular network, from a multimedia service provider or a network service provider. As described herein, multimedia content may include multimedia information having an audio portion and a video portion. Device resources may be taxed during reception and playback of this multimedia content. For example, resources such as network interfaces, displays, processing circuits, batteries, etc. may be heavily utilized and consumed during reception and playback of multimedia content. If adequate device resources are not available during reception and playback, the playback quality may be degraded and user enjoyment may decline. For example, a user may experience a delay or choppy playback if adequate bandwidth is not available on a network interface of the device. In another example, if sufficient power is not available for a device, reception and playback of the multimedia content may consume the remaining power left, for example, in a battery of the device which may be problematic if a user wanted to save this remaining power for other tasks or for an emergency situation.

In current devices, a user only has the ability to receive and playback all portions of received multimedia information including both the audio portion and the video portion. However, in some situations a user may want to receive or playback only a portion of the multimedia information. For example, a user may desire to play an audio only portion of the multimedia information. Thus, various embodiments are generally directed to an apparatus, method and other techniques for managing multimedia playback on a device. Some embodiments are particularly directed to playing an audio only portion of multimedia information received at a device. For example, a user may be interested in the audio portion of the multimedia information such as during playback of a music video. Playing an audio only portion of multimedia is particularly advantageous because it allows a user to enjoy a portion of the multimedia information while also conserving a device's resources. Playing an audio only portion of the multimedia content may also conserve battery power and, in some embodiments, lower network traffic on an interface. In other embodiments, both an audio portion and a video portion of the multimedia information may be received and played back. Additional embodiments and further details are discussed below with reference to the accompanying figures.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of an exemplary communication network system 100 suitable for implementing various embodiments described herein. In various embodiments, the communication network 100 includes a computing device 105, multimedia service provider 110 and a network service provider 115. In some embodiments, each element of the communication network 100 may be connected via interconnects 120. Interconnects 120 include one or more wireless or wired connections for communication of data and information.

In various embodiments, the elements of the communication network 100 may communicate voice communication via different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the elements of the communication network 100 may communicate data communications in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The communication network 100 may also be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. [00014] The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

The computing device 105 may be any type of wireless mobile device, mobile cellular phone, smartphone, tablet computer, netbook computer, notebook computer, laptop computer, and so forth for processing voice and data information. Computing device 105 is discussed in more detail below with respect to FIG. 2.

Multimedia service provider 110 includes one or more apparatuses, devices and systems for storing and providing multimedia content and information. In various embodiments, the multimedia service provider 110 includes one or more servers, one or more databases and circuitry for processing and delivering multimedia content and information. For example, the multimedia service provider 110 may include multimedia content and information, such as a video clip, stored in a database. The video clip may be streamed or otherwise provided from the multimedia service provider 110 to a computing device 105 through interconnections 120 or via a network service provider 115. The multimedia service 110 may provide these streaming services for free, for a fee, or through some other revenue generating method, such as advertisements. Examples of a multimedia service provider 110 include, but are not limited to, YOUTUBE®, BLIP.TV®, VIMEO®, HULU®, VEOH®, NETFLIX®, HBO®, HULU PLUS®, NBC®, CBS®, ABC® and so forth.

Network service provider 115 includes one or more apparatuses, devices, servers, databases, systems and circuitry for providing network access services to a user or subscriber. For example, a network service provider 115 may include, but is not limited to, a wireless carrier, a wireless network provider, an Internet service provider, a subscriber television service provider, and/or any other type of provider of network access services as may serve a particular implementation. Examples of a network service provider 115 include, but are not limited to, VERIZON®, AT&T®, T-MOBILE®, SPRINT®, COMCAST®, TIME WARNER®, VERIZON FIOS® COX CABLE®, and so forth.

Figure 2A:
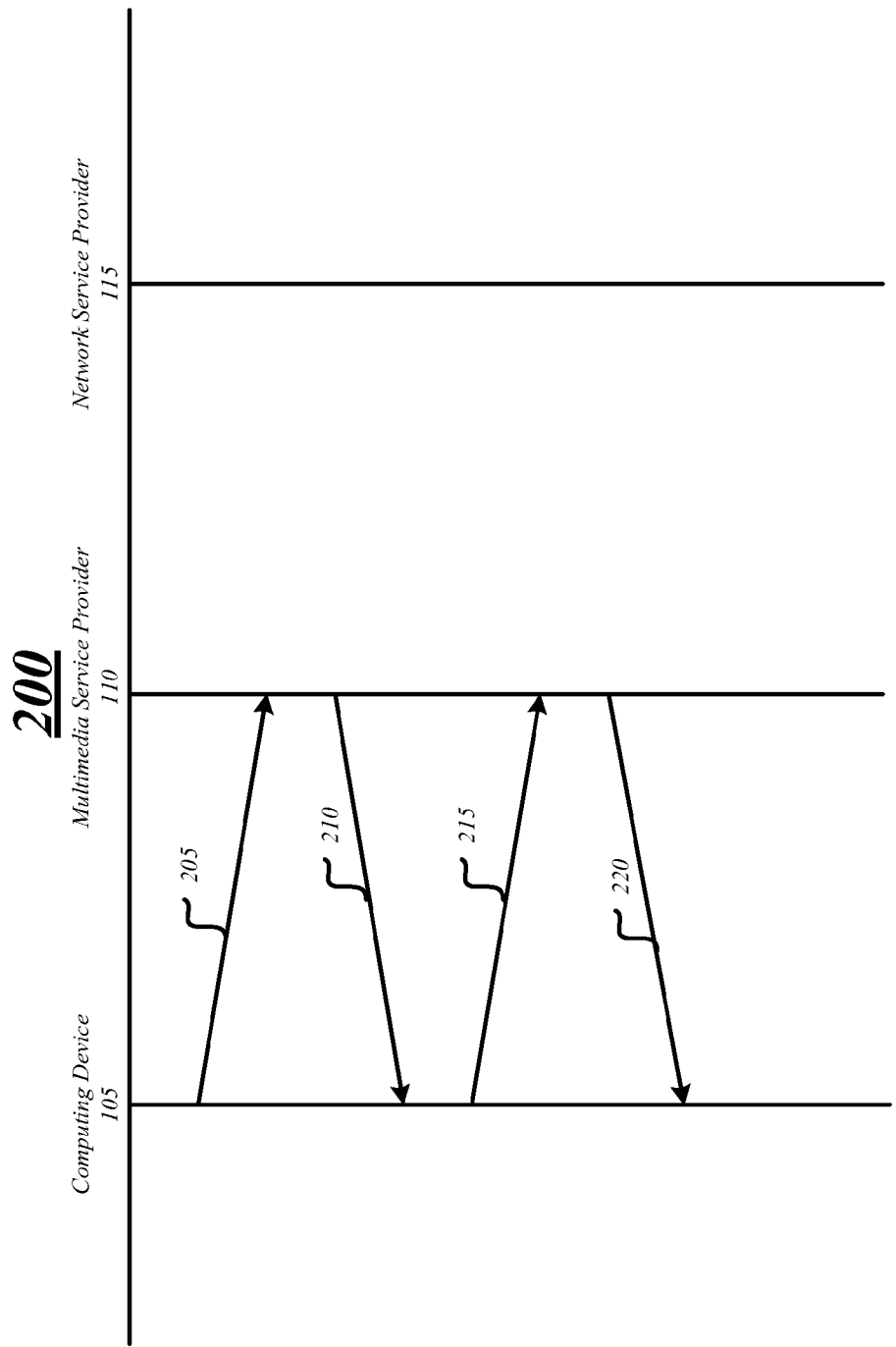
FIG. 2A illustrates an embodiment of a first signal diagram.

FIG. 2A illustrates an embodiment of a first signal diagram for requesting and receiving multimedia information through a multimedia service provider. At line 205, a computing device 105 may send a request for multimedia information. In some embodiments, the computing device 105 may request multimedia information including both a video portion and an audio portion. The request may be made directly to the multimedia service provider without going through a network service provider 115. In some embodiments, request 205 may be sent to the multimedia service provider 110 through a direct connection, such as a BLUETOOTH®, WLAN, WMAN, WWAN, WiMAX, WiFi and so forth. For example, the request may be sent to a server through a WLAN connection. Various embodiments are not limited in this manner.

At line 210, the multimedia service provider may provide multimedia information to the computing device 105 in response to the request 205 for the multimedia information. In various embodiments, the multimedia information may include a video portion and an audio portion. In this embodiment, the multimedia information may be sent to the computing device 105 without going through a network service provider 115.

In various embodiments, at line 215 the computing device 105 may send a request to the multimedia service provider 110 for only a portion of the multimedia information. As will be discussed in more detail below with respect to FIG. 4, the computing device 105 may request an audio only portion of the multimedia information. In response to a request 215 for a portion of the multimedia information, the multimedia service provider 110 may provider the requested portion to the computing device 105 at line 220. For example, the multimedia service provider 110 may provide an audio only portion of multimedia information to the computing device 105. Various embodiments are not limited in this manner. For example, in some embodiments, the multimedia service provider may provide an audio portion of multimedia information and an image, as will be discussed in more detail below.

Figure 2B:
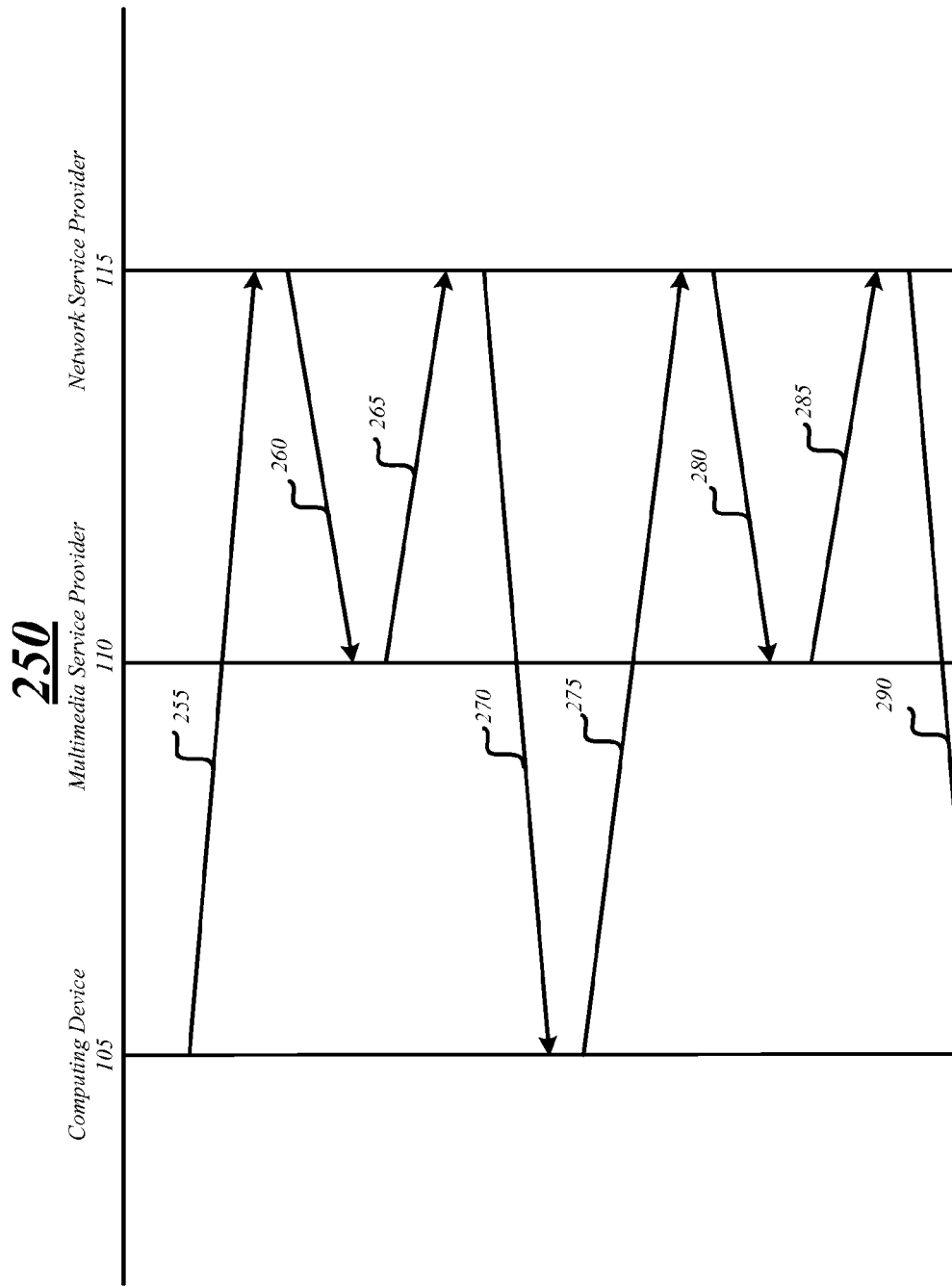
FIG. 2B illustrates an embodiment of a second signal diagram.

FIG. 2B illustrates an embodiment of a second signal diagram for requesting and receiving multimedia information. At line 255, a request is made from a computing device 105 to a network service provide 115 for multimedia information including a video portion and an audio portion. At line 260, the network service provider 115 may then forward the request or make its own request for the multimedia information to a multimedia service provider 110. The multimedia service provider 110 may provide send the multimedia information to the network service provider 115 in response to the request from the network service provider 115 at line 265. At line 270, the network service provider 115 may send the multimedia information to the computing device 105. However, various embodiments are not limited in this manner. For example, in other embodiments, the multimedia service provider may provide or send the multimedia information directly to the computing device 105 in response to receiving a request from the network service provider 115.

At line 275, the computing device may send a request for a portion of the multimedia information to the network service provider 115. The request may be a request for an audio only portion of the multimedia information. The request may be sent to the network service provider 115 in response to a number factors described in more detail in FIG. 4. The network service provider 115 may forward or send its own request to the multimedia service provider 110 for the portion of the multimedia information at line 280. In response to receiving a request for the portion of the multimedia information, the multimedia service provider 110 may send the send portion to the network service provider at line 285. In various embodiments, the multimedia service provider 110 may also send an image with the portion of the multimedia information to the network service provider 115. The image is described below in more detail with respect to FIG. 4. At line 290, the network service provider 115 sends the portion of multimedia information to the computing device 105 including any image that may have been included with the portion of the multimedia information. However, in various embodiments, the multimedia service provider 110 may send the portion of the multimedia information directly to the computing device 105. Various embodiments are not limited in this manner.

Figure 3:
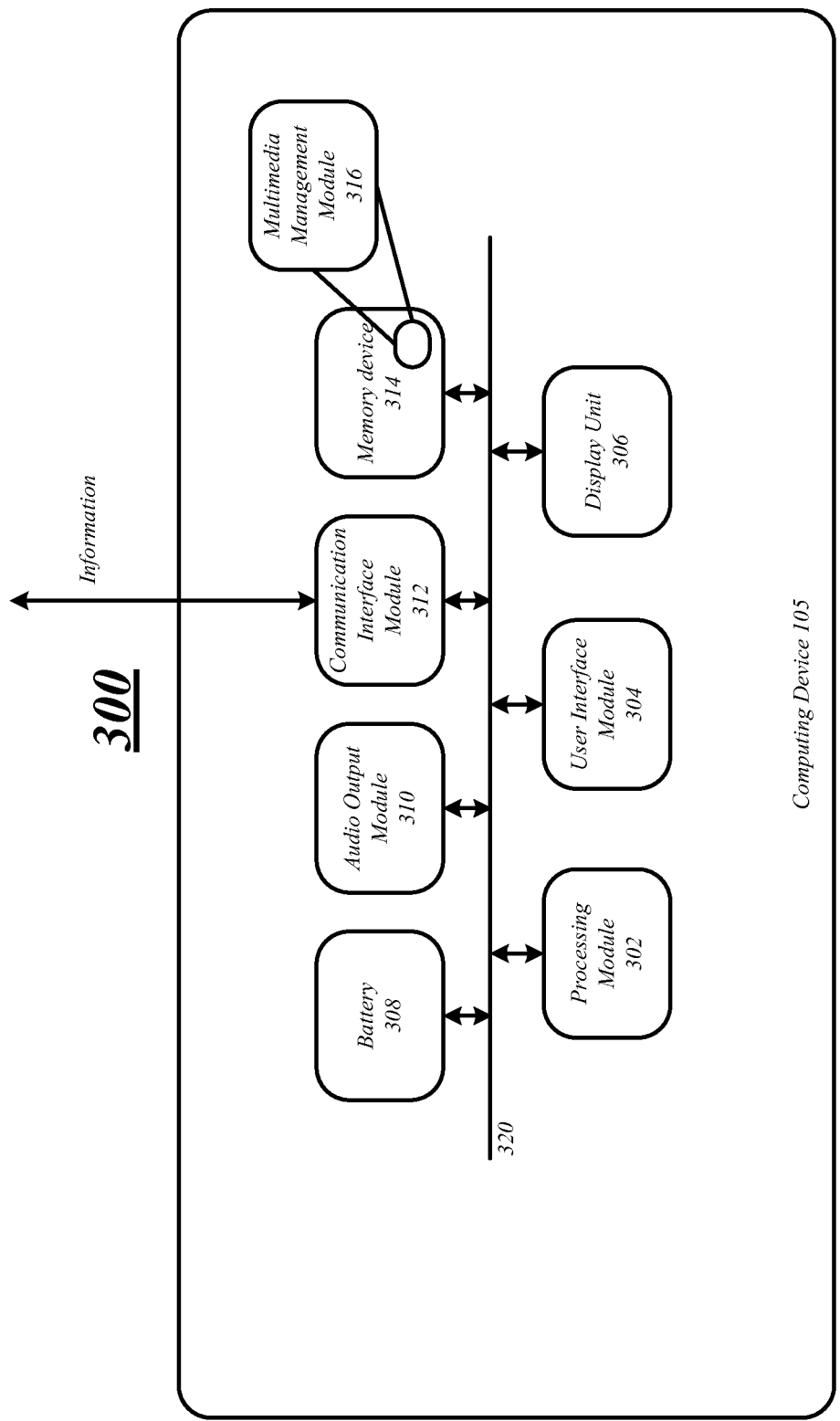
FIG. 3 illustrates an embodiment of a second system.

FIG. 3 illustrates an embodiment of an exemplary computing device 105 suitable for implementing various embodiments described herein. In various embodiments computing device 105 includes but is not limited to a processing circuit 302, an input module 304, a display unit 306, a battery 308, an audio output module 310, a communication interface module 312, a memory device 314, and a multimedia management module 316. The features and elements of the computing device 105 may be connected to and communicate with the other elements of the computing device 105 via an interconnect 320 such as one or more buses, control lines, and data lines.

The processing circuit 302 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. For example, the processing circuit 302 may include a graphical processing unit (GPU) for processing graphical and video information, in various embodiments. In other embodiments, computing device 105 may include a separate GPU. The processing circuit 302 may be connected to and communicate with the other elements of the computing system via an interconnect 320, such as one or more buses, control lines, and data lines.

The input module 304 may include at least one of an input device, such as one or more buttons, a keyboard, a keypad, a touchscreen display, a touch sensitive device, a microphone, or any other device used for inputting information into the device. The input module 304 may be used to input any information or data into the computing device 105. For example, the input module 304 may be used to input a multimedia mode selection during multimedia playback. In various embodiments, a user may use any one or more of the input devices to make the multimedia mode selection. For example, a user may utilize the input module 304 to select an audio only mode of playback. In another example a user may select an audio and video mode of playback using the input module 304. The selection may be made during playback of the multimedia content, before playback begins, or at any time.

The display unit 306 outputs information processed by the computing device 105. The display unit 306 may include at least one of a Liquid Crystal Display (LCD), a Thin Film Transistor-LCD (TFT-LCD), an Organic Light Emitting Diode (OLED), a flexible display, a three-dimensional (3D) display and a projector, for example. The display unit 306 may display a User interface (UI) or a Graphical User Interface (GUI) associated with controlling functionality of the computing device 105. The computer device may include two or more display units, according various embodiments. For example, in one embodiment, the computing device may include two LCD displays.

The battery 308 may be any type of battery to store power for the computing device 105 including, but not limited to, a lithium ion battery, a nickel cadmium battery, zinc chloride battery, or the like. The battery may be rechargeable. The computing device 105 may have one or more batteries. In some embodiments, the battery may be removable. In other embodiments, the battery may be fixed.

The audio output module 310 outputs audio signals and information stored in the memory 314 of the mobile system 105 or received from a wireless or wired connection of the communication interface module 312. For example, the audio output module 310 may output an audio portion of multimedia information received from a multimedia service provider and/or a network service provider. In another example, the audio output module 310 may output audio signals stored in the memory 314 such as a ring tone, a music file, or an audio portion of media content and information stored in the memory. The audio output module 310 is not limited in this manner. The audio output module 310 may output any audio signal, audio information or audio data. The audio output module 310 may include one or more of a receiver, a speaker, a buzzer, or the like. The audio output module 310 is shown as being part of the computing device 105. However, in some embodiments, the audio output module 310 may be separate from the computing device 105. For example, the audio output module 310 may be a BLUETOOTH® connected device and may still fall within the described embodiments.

The communication interface module 312 includes any device and circuitry for processing data and voice communications over wireless and wired connections. For example, the communication interface module 312 may include a receiver, a transmitter, one or more antennas, and one or more Ethernet connections. The specific design and implementation of the communication interface module 312 may be dependent upon the communications network in which the computing device 105 is intended to operate. For example, the computing device 105 may include a communication interface module 312 designed to operate in GSM with General Packet Radio Service (GPRS) systems (GSM/GPRS), CDMA/IxRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. data communications networks, and also designed to operate with any of a variety of voice communications networks, such as may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. Other types of data and voice networks, both separate and integrated, may also be utilized with computing device 105. The computing device 105 may also be compliant with other communications standards such as 3GSM, 3GPP, UMTS, 4G, etc. In some embodiments, the computing device 105 may be designed to operate in a plurality of communications networks and is not limited to a specific network.

In various embodiments, the communication interface module 312 may include one or more I/O controllers (not shown) to output any signals and information including audio signals and information. The I/O controller may enable communication over wireless and wired connections In various embodiments, the I/O controller may be separate component or module of computing device 105 and communicate with the audio output module 310 via one or more wired or wireless connections.

The memory device 314 may include one or more of random access memory (RAM), read-only memory (ROM), electrically erasable programmable read-only memory (EEPROM), flash memory, and hard disk memory. The memory device 314 is not limited to these memory components. For example, the memory device 314 may include a non-transitory computer-readable storage medium. These memory components can store data momentarily, temporarily, or permanently. The memory device 314 stores instructions and data for computing device 105. The memory device 314 may also store temporary variables or other intermediate information while the processing circuit 302 is executing instructions. In some embodiments, the memory is configured to store various types of data, including, without limitation, multimedia content and information. The multimedia information may be played on the computing device 105 and retrieved from memory device 314. The memory device 314 is not limited to storing the above discussed data, the memory device 314 may store any type of data.

In various embodiments, memory device 314 may store one or more data instructions for processing multimedia content and information. For example, memory device 314 may include a multimedia management module 316 for processing multimedia content and information received via the network interface module 312 or stored on the memory device 314. The operation of the multimedia management module 316 is discussed in more detail below with respect to FIG. 3. Memory device 314 is not limited to a multimedia management module 316. Memory device 314 stores other modules and instructions for processing data and information on the computing device 105. For example, memory device 314 may store an operating system for the computing device 105.

In some embodiments, multimedia management module 316 may not be included in memory device 314, but may be any hardware, software, or combination thereof capable of processing multimedia information in accordance with various embodiments disclosed herein. For example, in some embodiments, multimedia management module 316 may part of a controller or a processing circuit, such as processing circuit 302. Various embodiments are not limited in this manner.

The components illustrated in the computing device 105 are not meant to be limiting and are presented for purposes of illustration. In other embodiments, the configuration of the computing device 105 includes other (more or less) components than shown in FIG. 2. For example, in some embodiments computing device 105 may include one or more controllers (not shown) for controlling various functionality of the computing device 105 in addition to processing circuit 302. One of ordinary skill in the relevant art will appreciate that other configurations of the computing device 105 can be used without affecting the workings of the embodiments described herein.

Figure 4:
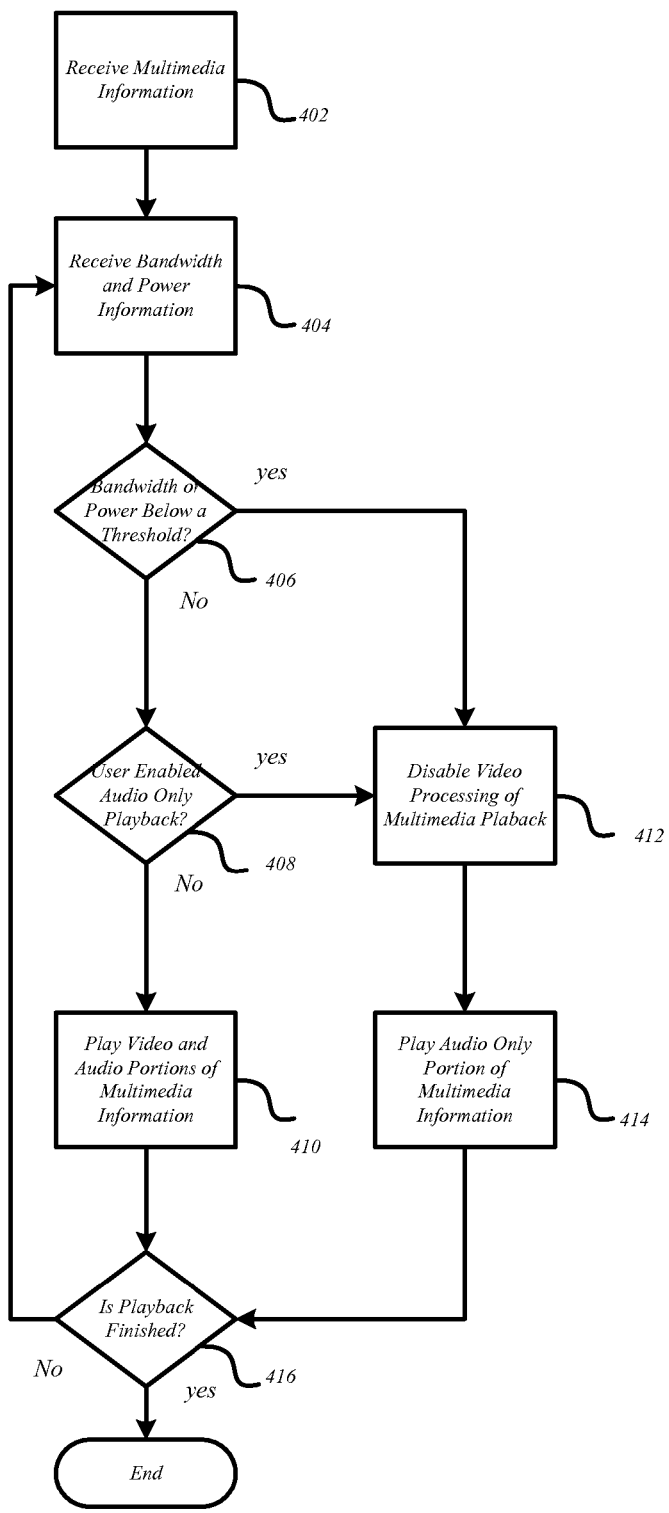
FIG. 4 illustrates an embodiment of a first logic flow.

FIG. 4 includes a logic flow diagram 400 illustrating one example of a multimedia playback and control thereof in accordance with some embodiments. For clarity purposes, the logic flow is discussed with reference to the computing device 105 of FIGS. 1 and 2. At block 402, the computing device 105 receives multimedia information through the communication interface module 312. In various embodiments, the communication interface module may receive the multimedia information from a multimedia service provider and/or a network service provider. The communication interface module 312 may receive any type of multimedia information including multimedia content having a video portion and an audio portion. The multimedia information may be in any file format including, but not limited to, moving picture experts group (MPEG) formats, DivX, Xvid, H.264, MICROSOFT® formats, ON2® formats, REAL® Networks Video formats, and so forth. In some embodiments, the multimedia information may include an image in any image format including, but not limited to, Raster formats such as JPEG, Exif, TIFF, RAW, GIF, BMP, PNG, PPM, PAM, HDR Raster formats, Vector formats, Compound formats, Stereo formats, and so forth.

In various embodiments, the multimedia information may be received at the computing device 105 for multimedia playback. Once the multimedia information is received at the computing device 105, the multimedia information may be processed by the multimedia management module 316 and the processing circuit 302. In some embodiments, the multimedia management module 316 will process the multimedia information including media content for playback. For example, received multimedia information having an audio portion and a video portion may be processed by the multimedia management module 316 for playback by the computing device 105 through a streaming application, multimedia application, video player application, a web-based application in an Internet browser, or any other application that may be used to play multimedia information.

In other embodiments, the multimedia management module 316 will process multimedia information stored in a memory of the computing device 105. For example, the multimedia management module 316 may process multimedia information stored in memory device 314 for playback through a streaming application, multimedia application, video player application, or a web-based application in an Internet browser. Various embodiments may process and play any type of media information received or stored on the computing device 105 and are not limited to processing multimedia information having an audio portion and a video portion. For example, the multimedia management module 316 may process media content having an audio only portion, a video only portion, or an image. The multimedia management module 316 is not limited in this manner.

At block 404, the multimedia management module 316 receives network bandwidth information and power information. In various embodiments, the multimedia management module 316 may receive the network bandwidth information and power information from one or more of a processing circuit, a controller including a network controller and/or a battery controller, a processing module, a communication interface module, or any other device, module, or software instruction that monitors network bandwidth and power.

The network bandwidth information may include one or more of a network bandwidth availability of a communication network, network bandwidth availability of a computing device, and network bandwidth availability of a network service provider and/or a multimedia service provider. However, the network bandwidth information is not limited in the manner. For example, the network bandwidth information may include any type of bandwidth information for communication in a communication network including bandwidth availability and transfer rates.

The power information may include one or more of a computing device power status, a current battery power level including remaining power, and a power usage profile. The power information is not limited in this manner. The power information may include any information about the power and battery of the computing device 105. For example, in some embodiments, the power information may include information on the remaining capacity of the battery 308 of computing device 105. The power information may include a remaining capacity in Watts, a percentage of remaining capacity, or an amount of time remaining until power will be expired or insufficient for normal operation. This power information may be actual or estimated based on the current status of the computing device 105.

At block 406, the multimedia management module 316 determines if the network bandwidth information is below a network bandwidth threshold and if the power information is below a power threshold. The multimedia management module 316 determines if the network bandwidth information and power information are below their respective thresholds based upon the received network bandwidth information and power information. In various implementations, the network bandwidth threshold may be a percentage of total bandwidth availability (e.g. 10% of total bandwidth available), a real-time transfer rate, or average transfer rate (e.g. 10 Mbps). The power threshold may be a percentage of remaining power capacity (e.g. 5%), a time of remaining power (e.g. 10 minutes), or an amount of remaining (e.g., 5 Watts). Various embodiments are not limited to the above-recited examples. For example, the network bandwidth threshold may be any percentage of total bandwidth available and the power threshold may be any percentage of power capacity remaining.

Each threshold may be determined or adjusted based on a number of factors or user selection. For example, the network bandwidth threshold may be determined such that a user of the computing device does not experience degradation in a quality of a playback. This determination may be based on a required transfer rate or required bandwidth availability of multimedia information. In another example, the network bandwidth threshold may be determined based on previously received multimedia information. For example, the network bandwidth threshold may be an average required transfer rate or required bandwidth availability of previously received multimedia information. In another example, the network bandwidth threshold may be selected by a user of the computing device through the input module 304.

The power threshold may also be set or adjusted based on a number of factors or user selection. In various embodiments, the power threshold may also be set or selected by a user. The power threshold may also be based on a desired amount of run-time before the power capacity is depleted. For example, the power threshold may be set such that at least one hour of run-time remains after playback of multimedia content for emergency situations. However, the determination is not limited in this manner and other factors may be used to set or adjust the power level threshold.

In various implementations, if the multimedia management module 316 determines that the network bandwidth information or power information is below its respective threshold, the multimedia management module 316 will disable video processing of multimedia information as further described with respect to block 412. If the multimedia management module 316 determines that the network bandwidth and power are above its respective thresholds, the multimedia management module 316 will determine if a user has enabled audio only playback as further described with respect to block 408. In other implementations or the same implementation, the multimedia management module 316 may determine if the network bandwidth information or power information is above its respective threshold and will not disable and/or will enable video processing of multimedia information.

With respect to block 408, the multimedia management module 316 determines if a user has enabled audio only playback. In various embodiments, a user may enable audio only playback on the computing device 105 via the input module 304. For example, a user may push a button, make a selection on a touch-screen, or make a selection verbally through a microphone to enable audio only playback. The user selection is not limited in this manner.

In various embodiments, the user may make a selection via an input module 304, such as a button, hardwired for audio only mode selection. The user may also make a selection through a settings menu in a graphical user interface (GUI) via the display unit 306. In some embodiments, the setting menu may be part of an operating system, such as WINDOWS®, ANDROID®, BLACKBERRY®, SYMBIAN®, IPHONE OS®, etc. In other embodiments or the same embodiment, the setting menu may be part of an application program, such as a video playback application or Internet browser application.

Once a user makes selection, a signal or instruction indicating the user selection is sent to the processing circuit 302 and multimedia management module 316. If a user has made a selection for audio only playback, the multimedia management module 316 disables video processing of multimedia information as further described with respect to block 412. However if the user has not made a selection or has selected audio and video playback, the multimedia management module 316 will permit or enable both audio and video playback of multimedia information as further described with respect to block 410.

At block 410, a video portion and an audio portion of multimedia information is played on the computing device 105. In various embodiments, multimedia information may be played on one or more output devices, such as the display unit 306 and the audio output module 310. For example, a video portion of multimedia information may be played on the display unit 306 and an audio portion may be played on the audio output module 310. The multimedia information may be played through various applications operating on the device. In one example, the multimedia information may be played through a streaming application, such as a YOUTUBE® application, HULU® application, VUDU® application, NETFLIX® application, etc. In another example, the multimedia information may be played through an Internet browser application, such as INTERNET EXPLORER®, FIREFOX®, OPERA®, CHROME®, etc. The multimedia management module 316 may permit or enable playing of a video portion and an audio portion of multimedia information when a user has not enabled audio only playback, the network bandwidth is above a network bandwidth threshold, and/or the power is above a power threshold.

At block 412, the multimedia management module 316 disables video processing. For example, in one embodiment, the multimedia management module 316 may disable video processing of multimedia information on the computing device 105 by disabling video processing by a graphics processing unit GPU and a video driver. The multimedia management module 316 may instruct or send a signal to the video driver and GPU to not process the video portion of multimedia information received at computing device 105.

In various embodiments, the multimedia management module 316 may intercept, capture or block the video portion of the multimedia information from being sent to the GPU and video driver. For example, multimedia management module 316 may block the video portion prior to it being sent or before it arrives at the GPU and video driver. In this case, the GPU and video driver will not receive any video portion to process. In the above-recited examples, power consumption including battery usage is reduced by limiting the amount of information the GPU and video driver must process. In some embodiments, the GPU may enter a sleep state or a lower power state when not processing video information. By putting the GPU into a lower power state or sleep state, the computing device 105 may save remaining power to use on other resources.

Various embodiments are not limited to the above-recited examples. In some embodiments, the multimedia management module 316 may send a signal, message, or information to the network service provider and the multimedia service provider. The message may inform the network service provider and the multimedia service provider to cease sending a video portion of multimedia information. This approach may save bandwidth processing by the network service provider and/or the multimedia service provider, the intermediary devices in a network, and the computing device receiving the multimedia information. In addition to saving network bandwidth processing and resources, a computing device also uses less power by not processing the video portion of the multimedia information by a GPU and a video driver. Other advantages may also be realized by not sending, receiving, and processing a video portion of multimedia information. For example, the computing device may not transmit and receive as much data and a user may save cost on a data plan.

At block 414, only an audio portion of multimedia information is played on the computing device 105. In various embodiments, the audio only portion of the multimedia information may be played on one or more output devices, such as the audio output module 310. The multimedia information may be played through various applications operating on the device. In one example, the audio portion of the multimedia information may be played through a streaming application, such as a YOUTUBE® application, HULU® application, VUDU® application, NETFLIX® application, etc. The audio portion may also be played through a music player such as WINDOWS® media player, GOOGLE® music player, Winamp, MX Player, ANDROID® music player, etc. In another example, the multimedia information may be played through an Internet browser application, such as INTERNET EXPLORER®, FIREFOX®, OPERA®, CHROME®, etc.

In some embodiments, an image may be displayed on the computer device 105 when an audio only portion of multimedia information in being played. The image may be displayed to replace the video portion of the multimedia information. The image may be in any image format including, but not limited to, Raster formats such as JPEG, Exif, TIFF, RAW, GIF, BMP, PNG, PPM, PAM, HDR Raster formats, Vector formats, Compound formats, Stereo formats, and so forth. The image may be received from the network service provider, multimedia service provider, an intermediate party, such as an advertisement agency, or from the memory device 314 of computing device 105. Various embodiments are not limited in this manner. In some embodiments, an image may be displayed in addition to playing a video portion and an audio portion.

The image content may include any type of image content, including by not limited to, an image relating to the content of the multimedia information, an image related to the network service provider or multimedia service provider, or an advertisement. The image may be displayed on an output device, such as the display unit 306. The image may be displayed on the entire display or a portion of the display as a banner, for example. The image may be of any size or resolution to ensure proper displaying on the display unit 306

In some embodiments, the network service provider or multimedia service provider may send a graphical advertisement image when audio only playback is enabled. The network service provider or multimedia service provider may send the image to the computer device 105 directly or through an advertisement agency. The graphical advertisement may be used to generate revenue for the network service provider or multimedia service provider. In some embodiments, a user of the computer device 105 may pay a fee to eliminate the reception of advertisements during audio only playback.

At block 416, the multimedia management module 316 determines if playback of the multimedia information is finished. If the multimedia management module 316 determines that playback is finished, the multimedia management module 316 and computing device 105 waits to receive additional multimedia information for playback. If the multimedia management module 316 determines that playback is not finished, the multimedia management module 316 continues to monitor playback, bandwidth information, power information and user input. In various implementations, the multimedia management module 316 continues to determine if the network bandwidth information is below a network bandwidth threshold, if the power information is below a power threshold, and/or if a user has enabled audio only playback on the computing device 105 until playback is finished. If the multimedia management module 316 determines if one of the above events occurs, the multimedia management module 316 will perform accordingly as discussed above with respect to blocks 406-414.

FIG. 5 illustrates an embodiment of a second logic flow 500. The logic flow 500 may be representative of some or all of the operations executed by one or more embodiments described herein. For example, the logic flow 500 may illustrate operations performed by the system 100 and, more particularly, computing device 105 of system 100. In the illustrated embodiment shown in FIG. 5, the logic flow 500 may include receiving multimedia information at a computing device at block 505. For example, the computing device 105 may receive multimedia information including an audio portion and a video portion. The multimedia information may be received by the communication interface module 312 of the computing device 105. The multimedia information may then be processed for playing on the computing device by the processing circuit 302 and the multimedia management module 316.

At 510, in some embodiments, the logic flow 500 may include receiving one or more of power information and bandwidth information for the computing device 105. The power information and bandwidth information may be used to determine if the computing device 105 has adequate resources for playing the multimedia information as previously discussed with respect to FIG. 4 blocks 406-416, for example.

In the illustrated embodiment of FIG. 5, the logic flow 500 may include disabling video processing for the computing device if the power information is below a power threshold or bandwidth information is below a bandwidth threshold at block 515. In various embodiments, a multimedia management module 316 may disable video processing of multimedia information on the computing device 105 by disable video processing by a graphics processing unit (GPU) and a video driver. In another example, the multimedia management module 316 may intercept, capture or block the video portion of the multimedia information from being sent to the GPU and video driver. In a third example, the multimedia management module 316 may send a signal, message, or information to the network service provider and the multimedia service provider informing them to cease sending a video portion of multimedia information. Various embodiments are not limited to the above-recited examples.

At 520, logic flow 500 may include sending an audio only portion of the multimedia information to one or more output devices coupled to the computing device. For example, in various embodiments, the multimedia management module 316 may send an audio only portion of multimedia information to the audio output module 310 for playing audio through one or more speakers, or the like. Various embodiments are not limited to this example. In some embodiments, the audio portion of the multimedia information may be sent to an output line jack on the computing device 105 for playing through connected headphones or an earpiece.

Figure 6:
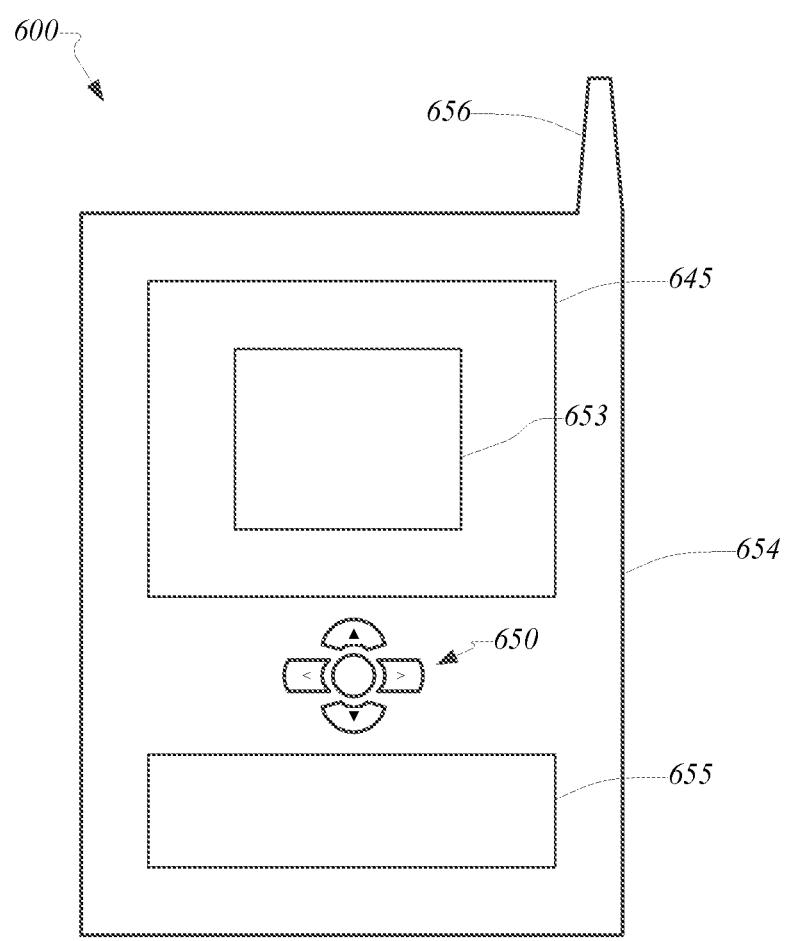
FIG. 6 illustrates an embodiment of a computing architecture.

FIG. 6 illustrates embodiments of a small form factor device 600 in which system 200 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a display 645, a navigation controller 650, a user interface 654, an I/O device 655, and an antenna 656. Display 645 may include any suitable display unit for displaying information appropriate for a mobile computing device. Navigation controller 650 may include one or more navigation features which may be used to interact with user interface 654. I/O device 655 may include any suitable I/O device for entering information into a mobile computing device. Examples for I/O device 655 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Figure 7:
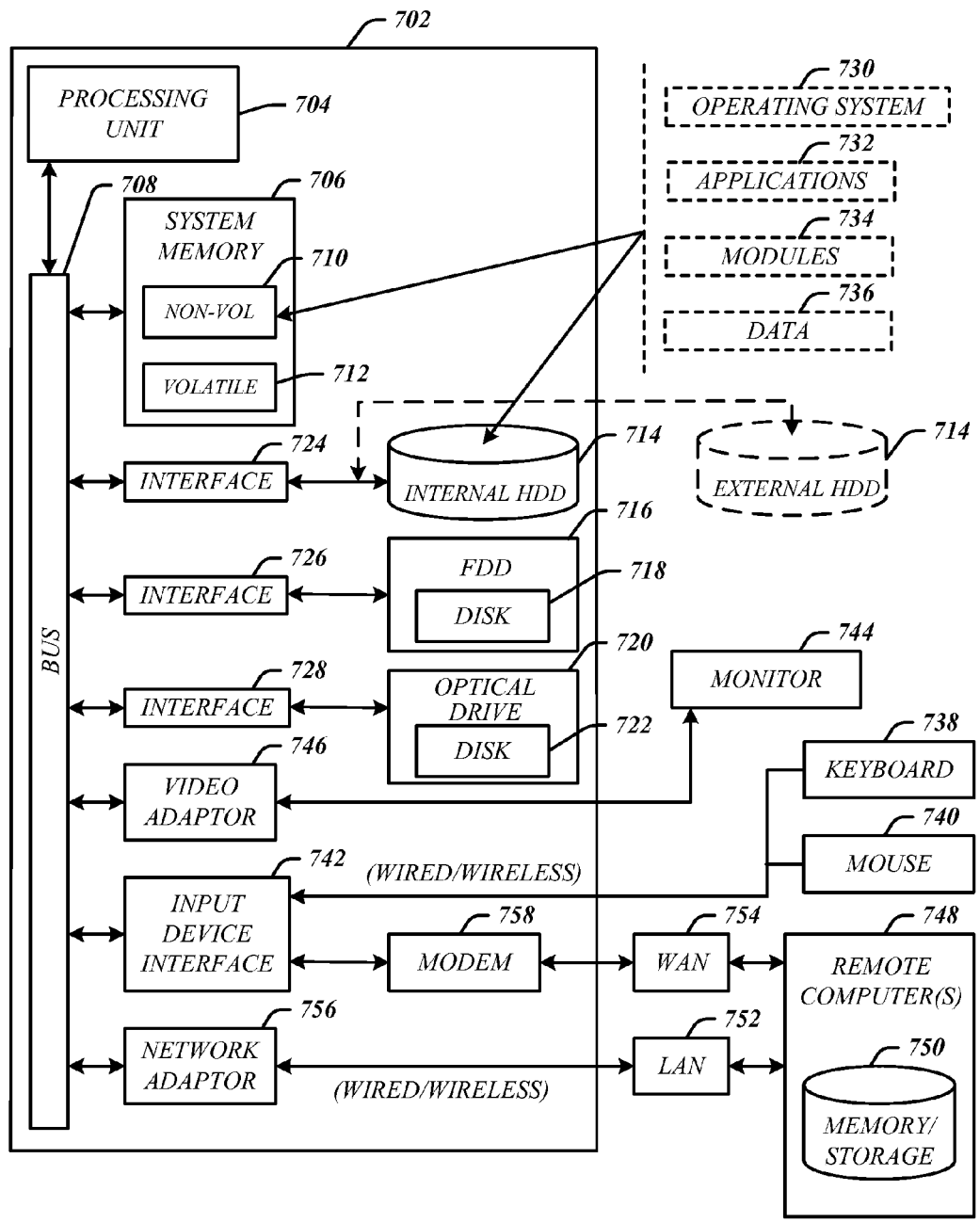
FIG. 7 illustrates an embodiment of a second computing architecture.

FIG. 7 illustrates an embodiment of an exemplary computing architecture 700 suitable for implementing various embodiments as previously described. In one embodiment, the computing architecture 700 may comprise or be implemented as part of computing device 105.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described in FIG. 3.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the touch gesture recognition system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through fifty-six (1-56) provided below are intended to be exemplary and non-limiting.

In a first example, an apparatus may comprise a memory, a processing circuit coupled to the memory, a communication interface coupled to the memory and the processing circuit, the communication interface to receive multimedia information at the computing device and a multimedia management module. The multimedia management module to receive one or more of power information and bandwidth information, disable video processing for the computing device when the power information is below a power threshold or the bandwidth information is below a bandwidth threshold, and send an audio only portion of the multimedia information to one or more output devices coupled.

In a second example, the multimedia information may comprise a combination of audio information and video information.

In a third example, the multimedia management module to enable video processing for the computing device when the power information is above a power threshold or the bandwidth information is above a bandwidth threshold, and send an audio portion of the multimedia information and a video portion of the multimedia information to one or more output devices.

In a fourth example, the apparatus may comprise one or more output device coupled to the comprising at least one of a speaker, a display, an output line and a projector.

In a fifth example, the apparatus may comprise an interface to receive a signal indicating selection of an audio only mode of operation and the multimedia management module to disable the video processing based on the received signal.

In a sixth example, a multimedia management module may receive a graphical advertisement for display during an audio only mode operation and send the graphical advertisement to a display when video processing is disabled.

In a seventh example, multimedia information may be received from a multimedia provider or a network service provider.

In an eighth example, a multimedia management module may send a multimedia mode selection signal based on a comparison of the power information to the power threshold or the bandwidth information to the bandwidth threshold and receive an audio only portion of the multimedia information when the power information is below the power threshold or the bandwidth information is below the bandwidth threshold or receive an audio portion and a video portion of the multimedia information when the power information is above the power threshold or the bandwidth information is above the bandwidth threshold.

In a ninth example, a multimedia management module may block sending a video portion of the multimedia information to a graphics processing unit based on a comparison of the power information to the power threshold or the bandwidth information to the bandwidth threshold.

In a tenth example, a multimedia management module may send a signal to not process the video portion of the received multimedia information based on a comparison of the power information to the power threshold or the bandwidth information to the bandwidth threshold.

In a eleventh example, a power information comprising one or more of a computing device power status, a current battery power level including remaining power, or a power usage profile.

In a twelfth example, a bandwidth information comprising one or more of a network bandwidth availability of a communication network, network bandwidth availability of the computing device, network bandwidth availability of a network service provider, or network bandwidth availability of a multimedia service provider.

In a thirteenth example, a computer-implemented method, comprising receiving multimedia information at a computing device, receiving one or more of power information and bandwidth information for the computing device, disabling video processing for the computing device when the power information is below a power threshold or the bandwidth information is below a bandwidth threshold and sending an audio only portion of the multimedia information to one or more output devices coupled to the computing device.

In a fourteenth example, a computer-implemented method wherein multimedia information comprising a combination of audio information and video information.

In a fifteenth example, a computer-implemented method may comprise enabling video processing for the computing device when the power information is above a power threshold or the bandwidth information is above a bandwidth threshold and sending an audio portion of the multimedia information and a video portion of the multimedia information to one or more output devices coupled to the computing device.

In a sixteenth example, a computer-implemented method may comprise receiving a signal indicating selection of an audio only mode of operation for the computing device and disabling the video processing based on the received signal.

In a seventeenth example, a computer-implemented method may comprise receiving a graphical advertisement for display during an audio only mode operation and sending the graphical advertisement to a display of the computing device when video processing for the computing device is disabled.

In a eighteenth example, a computer-implemented method wherein multimedia information received from a multimedia provider or a network service provider.

In a nineteenth example, a computer-implemented method may comprise sending a multimedia mode selection signal to the multimedia provider or the network service provider based on a comparison of the power information to the power threshold or the bandwidth information to the bandwidth threshold and receiving an audio only portion of the multimedia information when the power information is below the power threshold or the bandwidth information is below the bandwidth threshold or receiving an audio portion and a video portion of the multimedia information when the power information is above the power threshold or the bandwidth information is above the bandwidth threshold.

In a twentieth example, a computer-implemented method may comprise blocking transmission of a video portion of the multimedia information to the graphics processing unit based on a comparison of the power information to the power threshold or the bandwidth information to the bandwidth threshold.

In a twenty-first example, a computer-implemented method may comprise sending a signal to not process the video portion of the multimedia information received at the computing device based on a comparison of the power information to the power threshold or the bandwidth information to the bandwidth threshold.

In a twenty-second example, an article comprising a computer-readable storage medium containing a plurality of instructions that when executed enable a processing circuit to receive multimedia information at a computing device, receive one or more of power information and bandwidth information for the computing device, disable video processing for the computing device when the power information is below a power threshold or the bandwidth information is below a bandwidth threshold and send an audio only portion of the multimedia information to one or more output devices coupled to the computing device once the video processing is disabled.

In a twenty-third example, multimedia information comprising a combination of audio information and video information.

In a twenty-fourth example, instructions that when executed enable the processing circuit to enable video processing for the computing device when the power information is above a power threshold or the bandwidth information is above a bandwidth threshold and send an audio portion of the multimedia information and a video portion of the multimedia information to one or more output devices.

In a twenty-fifth example, instructions that when executed enable the processing circuit to receive a signal indicating selection of an audio only mode of operation for the computing device and disable the video processing based on the received signal.

In a twenty-sixth example, instructions that when executed enable the processing circuit to receive a graphical advertisement for display during an audio only mode operation and send the graphical advertisement to a display of the computing device when video processing for the computing device is disabled.

In a twenty-seventh example, multimedia information received from a multimedia provider or a network service provider.

In a twenty-eighth example, instructions that when executed enable the processing circuit to send a multimedia mode selection signal to the multimedia provider or the network service provider based on a comparison of the power information to the power threshold or the bandwidth information to the bandwidth threshold and receive an audio only portion of the multimedia information when the power information is below the power threshold or the bandwidth information is below the bandwidth threshold or receive an audio portion and a video portion of the multimedia information when the power information is above the power threshold or the bandwidth information is above the bandwidth threshold.

In a twenty-ninth example, instructions that when executed enable the processing circuit to block sending of a video portion of the multimedia information to the a graphics processing unit based on a comparison of the power information to the power threshold or the bandwidth information to the bandwidth threshold.

In a thirtieth example, instructions that when executed enable the processing circuit to send a signal to not process the video portion of the multimedia information received at the computing device based on a comparison of the power information to the power threshold or the bandwidth information to the bandwidth threshold.

In a thirty-first example, at least one machine readable medium comprising a plurality of instructions that in response to being executed on a computing device, cause the computing device to carry out a method according to any one of examples thirteen to twenty-one.

In a thirty-second example, a communication device arranged to perform the method of any one of examples thirteen to twenty-one.

In a thirty-third example, an apparatus for multimedia playback, configured to perform the method of any one of examples thirteen to twenty-one.

In a thirty-fourth example, an apparatus may comprise means for performing the method of examples thirteen to twenty-one.

In a thirty-fifth example, a wireless communication device may comprise a memory, a processing circuit coupled to the memory, a communication interface coupled to the memory and the processing circuit to receive multimedia information and a multimedia management module to receive one or more of power information and bandwidth information for the wireless communication device, enable or disable video processing for the computing device based on a comparison between the power information and a power threshold and a comparison between the bandwidth information and a bandwidth threshold, and send an audio only portion of the multimedia information to one or more output devices coupled to the wireless communication device when the power information is below the power threshold or the bandwidth information is below the bandwidth threshold.

In a thirty-sixth example, the multimedia information further comprises a combination of audio information and video information.

In a thirty-seventh example, the wireless communication device may comprise a multimedia management module to enable video processing for the computing device when the power information is above a power threshold or the bandwidth information is above a bandwidth threshold, and send an audio portion of the multimedia information and a video portion of the multimedia information to one or more output devices coupled to the computing device.

In a thirty-eighth example, the wireless communication device having one or more output devices comprising at least one of a speaker, a display, an output line and a projector.

In a thirty-ninth example, the wireless communication device may comprise an interface to receive a signal indicating selection of an audio only mode of operation for the computing device and the multimedia management module to disable the video processing based on the received signal.

In a fortieth example, the wireless communication device may comprise a multimedia management module to receive a graphical advertisement for display during an audio only mode operation and to send the graphical advertisement to a display of the computing device when video processing for the computing device is disabled.

In a forty-first example, the wireless communication device may comprise multimedia information received from a multimedia provider or a network service provider.

In a forty-second example, the wireless communication device may comprise a multimedia management module to send a multimedia mode selection signal based on a comparison of the power information to the power threshold or the bandwidth information to the bandwidth threshold and receive an audio only portion of the multimedia information when the power information is below the power threshold or the bandwidth information is below the bandwidth threshold or receive an audio portion and a video portion of the multimedia information when the power information is above the power threshold or the bandwidth information is above the bandwidth threshold.

In a forty-third example, the wireless communication device may comprise a multimedia management module to block transmission of a video portion of the multimedia information to a graphics processing unit based on a comparison of the power information to the power threshold or the bandwidth information to the bandwidth threshold.

In a forty-fourth example, the wireless communication device may comprise a multimedia management module to send a signal to not process the video portion of the multimedia information received at the computing device based on a comparison of the power information to the power threshold or the bandwidth information to the bandwidth threshold.

In a forty-fifth example, the wireless communication device may comprise power information comprising one or more of a computing device power status, a current battery power level including remaining power, and a power usage profile.

In a forty-sixth example, the wireless communication device may comprise bandwidth information comprising one or more of a network bandwidth availability of a communication network, network bandwidth availability of the computing device, and network bandwidth availability of a network service provider and/or a multimedia service provider.

In a forty-seventh example, an apparatus may comprise means for receiving multimedia information at a computing device, means for receiving one or more of power information and bandwidth information for the computing device, means for disabling video processing for the computing device when the power information is below a power threshold or the bandwidth information is below a bandwidth threshold and means for sending an audio only portion of the multimedia information to one or more output devices coupled to the computing device.

In a forty-eighth example, an apparatus may comprise means for receiving multimedia information, the multimedia information comprising a combination of audio information and video information.

In a forty-ninth example, an apparatus may comprise means for enabling video processing for the computing device when the power information is above a power threshold or the bandwidth information is above a bandwidth threshold and means for sending an audio portion of the multimedia information and a video portion of the multimedia information to one or more output devices coupled to the computing device.

In a fiftieth example, an apparatus may comprise means for receiving a signal indicating selection of an audio only mode of operation for the computing device and means for disabling the video processing based on the received signal.

In a fifty-first example, an apparatus may comprise means for receiving a graphical advertisement for display during an audio only mode operation and means for sending the graphical advertisement to a display of the computing device when video processing for the computing device is disabled.

In a fifty-second example, an apparatus comprising means for receiving multimedia information, wherein the multimedia information is received from a multimedia provider or a network service provider.

In a fifty-third example, an apparatus may comprise means for sending a multimedia mode selection signal to the multimedia provider or the network service provider based on a comparison of the power information to the power threshold or the bandwidth information to the bandwidth threshold and means for receiving an audio only portion of the multimedia information when the power information is below the power threshold or the bandwidth information is below the bandwidth threshold or means for receiving an audio portion and a video portion of the multimedia information when the power information is above the power threshold or the bandwidth information is above the bandwidth threshold.

In a fifty-fourth example, an apparatus may comprise means for blocking a video portion of the multimedia information to a graphics processing unit based on a comparison of the power information to the power threshold or the bandwidth information to the bandwidth threshold.

In a fifty-fifth example, an apparatus may comprise means for sending a signal to not process the video portion of the multimedia information received at the computing device based on a comparison of the power information to the power threshold or the bandwidth information to the bandwidth threshold.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects. What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a memory located at a computing device;
   a processing circuit coupled to the memory;
   a communication interface coupled to the memory and the processing circuit to receive multimedia information from a service provider; and
   a multimedia management module to:
      receive one or more of power information and bandwidth information:
      disable video processing operations at the computing device when the power information is below a power threshold or the bandwidth information is below a bandwidth threshold;
      send an audio only portion of the multimedia information to one or more output devices coupled with the computing device;
      receive a graphical advertisement for display during the audio only mode operation;
      enable video processing operations at the computing device for display of the graphical advertisement;
      send the graphical advertisement to a display coupled with the computing device; and
      disable video processing operations after the graphical advertisement was sent.

2. The apparatus of claim 1, the multimedia information comprising a combination of audio information and video information.

3. The apparatus of claim 1, the multimedia management module to enable video processing at the computing device when the power information is above a power threshold or the bandwidth information is above a bandwidth threshold, and send an audio portion of the multimedia information and a video portion of the multimedia information to the one or more output devices coupled with the computing device.

4. The apparatus of claim 3, comprising the one or more output devices coupled to the computing device comprising at least one of a speaker, a display, an output line and a projector.

5. The apparatus of claim 1, the multimedia information received from a multimedia provider or a network service provider.

6. The apparatus of claim 1, the multimedia management module to block sending a video portion of the multimedia information to a graphics processing unit at the computing device based on a comparison of the power information to the power threshold or the bandwidth information to the bandwidth threshold.

7. The apparatus of claim 1, the multimedia management module to send a signal to a graphics processing unit at the computing device to not process the video portion of the received multimedia information based on a comparison of the power information to the power threshold or the bandwidth information to the bandwidth threshold.

8. The apparatus of claim 1, the power information comprising one or more of a power status of the computing device, a current battery power level of the computing device including remaining power, or a power usage profile of the computing device.

9. The apparatus of claim 1, the bandwidth information comprising one or more of a network bandwidth availability of a communication network, network bandwidth availability of the computing device, network bandwidth availability of a network service provider, or network bandwidth availability of a multimedia service provider.

10. A computer-implemented method, comprising:
   receiving multimedia information from a service provider at a computing device;
   receiving one or more of power information and bandwidth information for the computing device;
   disabling video processing for the computing device when the power information is below a power threshold or bandwidth information is below a bandwidth threshold; and
   sending an audio only portion of the multimedia information to one or more output devices coupled to the computing device;
   receiving a graphical advertisement for display during the audio only mode operation;
   enabling video processing operations at the computing device for display of the graphical advertisement;
   sending the graphical advertisement to a display coupled with the computing device; and
   disabling video processing operations after sending the graphical advertisement.

11. The computer-implemented method of claim 10, the multimedia information comprising a combination of audio information and video information.

12. The computer-implemented method of claim 10, comprising:
   enabling video processing for the computing device when the power information is above a power threshold or the bandwidth information is above a bandwidth threshold; and sending an audio portion of the multimedia information and a video portion of the multimedia information to one or more output devices coupled to the computing device.

13. The computer-implemented method of claim 10, the multimedia information received from a multimedia provider or a network service provider.

14. The computer-implemented method of claim 10, comprising blocking transmission of a video portion of the multimedia information to a graphics processing unit at the computing device based on a comparison of the power information to the power threshold or the bandwidth information to the bandwidth threshold.

15. The computer implemented method of claim 10, comprising sending a signal to not process the video portion of the multimedia information received at the computing device based on a comparison of the power information to the power threshold or the bandwidth information to the bandwidth threshold.

16. An article comprising a non-transitory computer-readable storage medium containing a plurality of instructions that when executed enable a processing circuit to:
   receive multimedia information from a service provider at a computing device;
   receive one or more of power information and bandwidth information for the computing device;
   disable video processing for the computing device when the power information is below a power threshold or the bandwidth information is below a bandwidth threshold; and
   send an audio only portion of the multimedia information to one or more output devices coupled to the computing device once video processing is disabled;
   receive a graphical advertisement for display during the audio only mode operation;
   enable video processing operations at the computing device for display of the graphical advertisement;
   send the graphical advertisement to a display coupled with the computing device; and
   disable video processing operations after the graphical advertisement was sent.

17. The article of claim 16, comprising instructions that when executed enable the processing circuit to:
   enable video processing for the computing device when the power information is above a power threshold or the bandwidth information is above a bandwidth threshold; and
   send an audio portion of the multimedia information and a video portion of the multimedia information to one or more output devices coupled to the computing device.

18. The article of claim 16, comprising instructions that when executed enable the processing circuit to block sending of a video portion of the multimedia information to a graphics processing unit at the computing device based on a comparison of the power information to the power threshold or the bandwidth information to the bandwidth threshold.

* * * * *